(12) United States Patent
Kraus (10) Patent No.: US 7,809,019 B2
(45) Date of Patent: Oct. 5, 2010

(54) BONDING CIRCUIT FOR A LINE CARD AND METHOD FOR BONDING DATA FRAGMENTS

(75) Inventor: Jochen Kraus, Valencia-Masarrochos (ES)

(73) Assignee: Lantiq Deutschland GmbH, Neubiberg (DE)

( * ) Notice: Subject to any disclaimer, the term of this patent is extended or adjusted under 35 U.S.C. 154(b) by 918 days.

(21) Appl. No.: 11/635,290

(22) Filed: Dec. 7, 2006

(65) Prior Publication Data

US 2007/0140286 A1    Jun. 21, 2007

(30) Foreign Application Priority Data

Dec. 9, 2005    (DE) .................... 10 2005 058 982

(51) Int. Cl.
*H04J 3/24* (2006.01)
(52) U.S. Cl. .................... 370/474; 370/230; 370/420; 370/428; 370/535; 379/413.02
(58) Field of Classification Search ............. 370/474, 370/230, 389, 419, 420, 428, 535; 379/413.03
See application file for complete search history.

(56) References Cited

U.S. PATENT DOCUMENTS

| 5,953,142 | A  | * | 9/1999  | Chiaroni et al. ............... 398/82 |
| 6,831,919 | B1 | * | 12/2004 | Choi ...................... 370/395.6 |
| 2002/0021468 | A1 | * | 2/2002 | Kato et al. ................. 359/152 |
| 2002/0150100 | A1 |  | 10/2002 | White et al. |
| 2004/0052268 | A1 |  | 3/2004 | Lewin et al. |
| 2004/0141609 | A1 | * | 7/2004 | Shi ...................... 379/413.02 |
| 2006/0215689 | A1 | * | 9/2006 | Liu et al. .................... 370/465 |

FOREIGN PATENT DOCUMENTS

WO    WO 2004/066107    8/2004

* cited by examiner

*Primary Examiner*—Ricky Ngo
*Assistant Examiner*—Luat Phung
(74) *Attorney, Agent, or Firm*—SpryIP, LLC (57) ABSTRACT

In a method for bonding data fragments, data fragments are delayed in such a manner that a first transmission time for a direct transmission of data fragments between a master line card and a terminal connection via a first group of subscriber lines of a telephone line bundle corresponds to a second transmission time for an indirect transmission of data fragments between the master line card, an uplink card, and a further line card via a second group of subscriber lines of the line bundle.

28 Claims, 11 Drawing Sheets

BONDING CIRCUIT FOR A LINE CARD AND METHOD FOR BONDING DATA FRAGMENTS

BACKGROUND OF THE INVENTION

The invention relates to a bonding circuit for an xDSL line card which, in particular, can be used in a DSLAM (Digital Subscriber Line Access Multiplexer) circuit, and a method for bonding data fragments over a number of line cards.

In the case of an access to a broadband data transmission network, there is a continuous wish for higher data transmission rates and greater ranges for transmitting the data over existing telephone lines. Access to a data network, for example the Internet, is possible via conventional telephone lines by means of xDSL transceivers.

Figure 1:
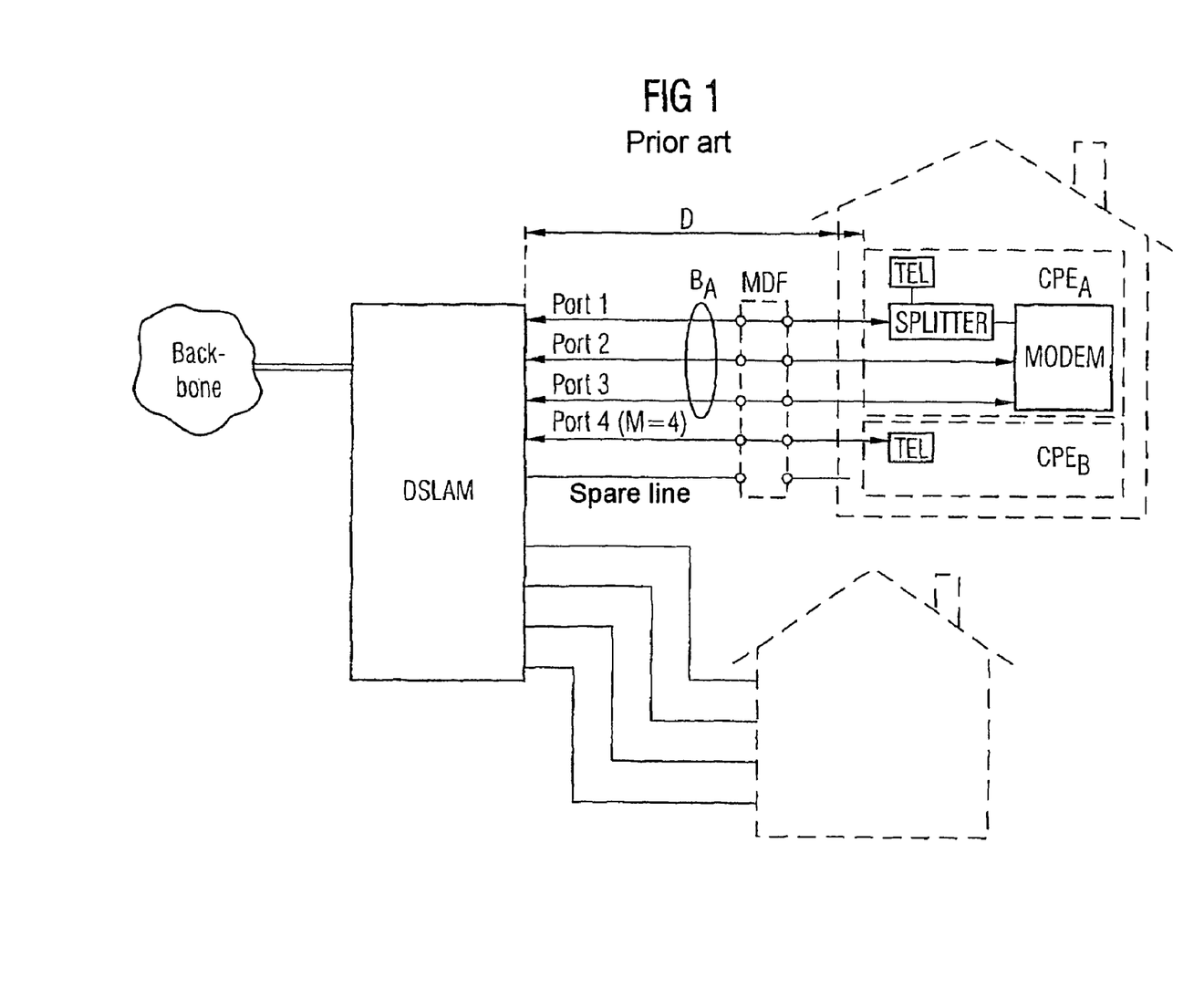
FIG. 1 is a conventional network access circuit arrangement.

FIG. 1 shows a conventional network access to a broadband backbone data transmission network. The backbone data transmission network, for example the Internet, is connected to a DSLAM (Digital Subscriber Line Access Multiplexer) line via a broadband data transmission line, for example an optical fibre line. The DSLAM circuit is located, for example, in a DSLAM cabinet of an exchange (central office). The DSLAM circuit is the bridge to the data transmission network. The DSLAM circuit represents a combination between an xDSL modem block and a multiplex system for the connecting line to the data network, for example to an Internet provider (IP).

Figure 2:
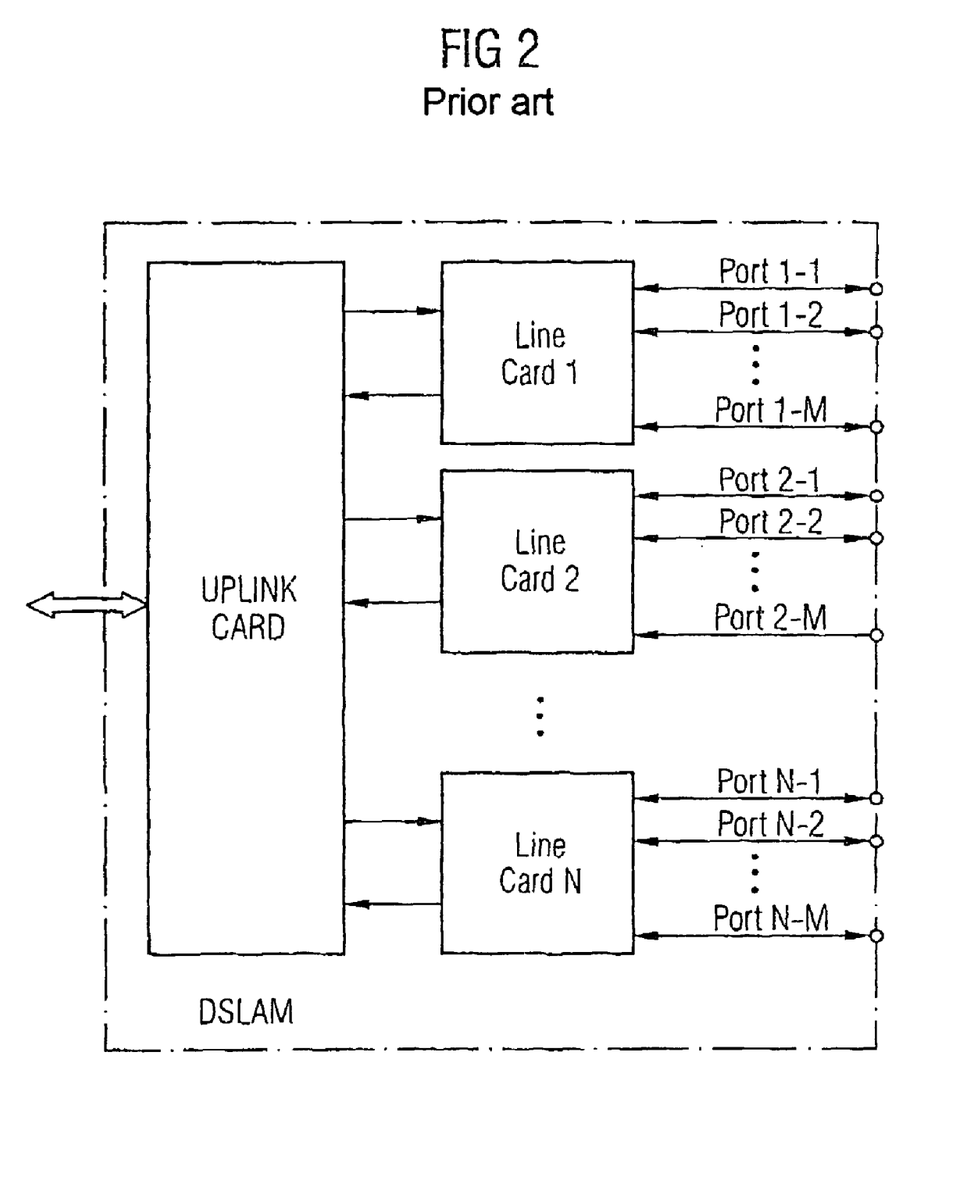
FIG. 2 is a conventional DSLAM circuit.

FIG. 2 shows a conventional DSLAM circuit. The conventional DSLAM circuit contains an uplink card for exchanging data with the backbone data transmission network and a number of xDSL line cards connected to the uplink card. Each xDSL line card, in turn, has a number of ports for connecting telephone lines which, for example, are formed by twisted two-wire copper telephone lines. In the example of a DSLAM circuit according to the prior art, shown in FIG. 2, the DSLAM circuit contains N line cards, each line card having M ports.

FIG. 1 is used for illustrating the problems forming the basis of the invention. In the example shown in FIG. 1, a first terminal connection $CPE_A$ (Customer Premise Equipment) is connected to ports 1-3 of a line card of the DSLAM circuit, for example via a main distribution frame (MDF). The terminal connection CPE comprises a splitter to which a conventional telephone line is connected, on the one hand, and a data modem, on the other hand. The data modem is also connected directly to the DSLAM circuit via two further telephone lines. The three telephone lines, with which the terminal connection $CPE_A$ is connected to the DSLAM circuit, form a telephone line bundle $B_A$ for increasing the data transmission rate between the DSLAM circuit and the terminal connection $CPE_A$. The data transmission rate on a telephone line is dependent on, among other things, the distance between the DSLAM circuit and the terminal connection CPE. The greater the distance, the lower the maximum data transmission rate of the telephone line. To increase the data transmission rate to a terminal connection CPE, therefore, a number of telephone lines are combined to form a telephone line bundle and are connected to a terminal connection. Each telephone line in the example shown in FIG. 1 has, for example, a data transmission rate of 50 MB/sec and thus an aggregate data transmission rate of about 150 MB/sec can be achieved for the terminal connection $CPE_A$.

Figure 3:
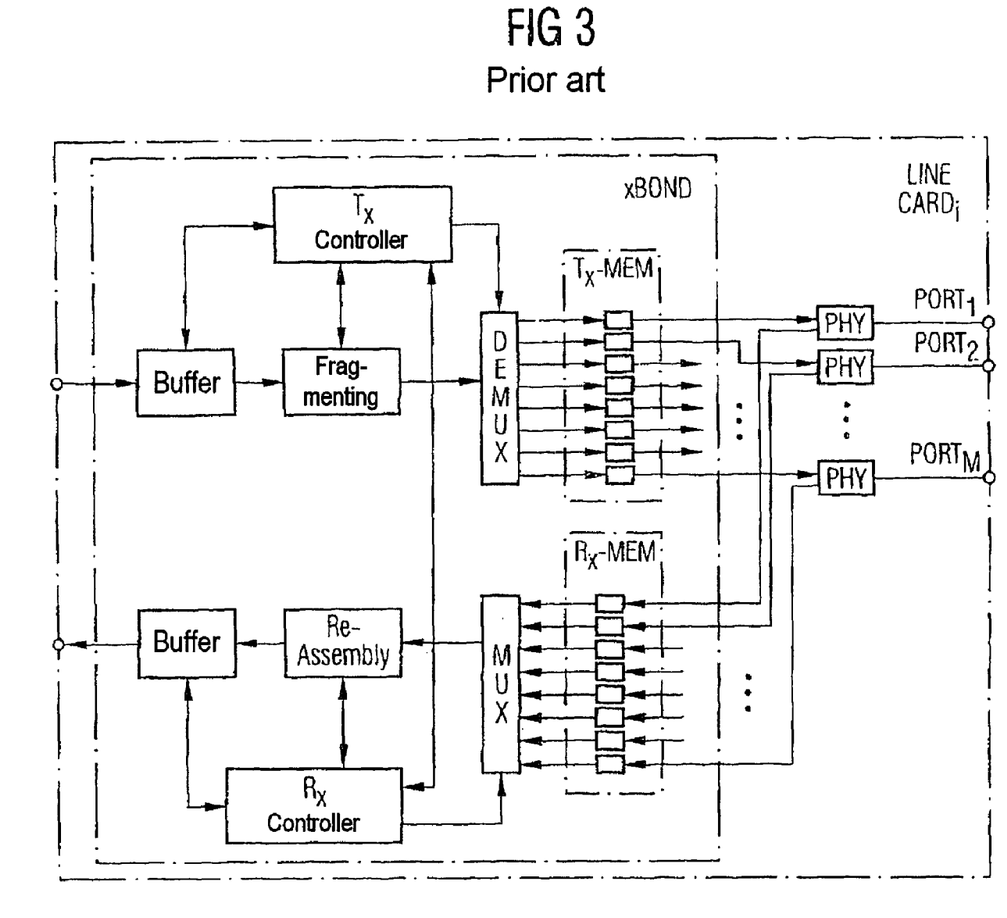
FIG. 3 is a conventional line card.

FIG. 3 shows a conventional line card which is provided in the conventional DSLAM circuit represented in FIG. 2. The conventional xDSL line driver circuit as shown in FIG. 3 has a transmit signal path and a receive signal path. On the transmit signal path, a transmit data packet buffer for temporarily storing data packets is received from the uplink card of the DSLAM circuit by a bonding circuit (x-bond) provided on the line card is provided. The temporarily stored data packets DP are divided into data fragments DF by a subsequent fragmentation circuit and delivered to a demultiplexer D-MUX which distributes the data fragments DF to different signal lines. The bonding circuit contains a transmit data packet buffer (TX-MEM), the output of which is connected to x-DSL transceivers (PHY). The transmit signal path of the bonding circuit (x-bond) contains a transmit controller for driving the data packet buffer, the fragmentation circuit and the demultiplexer.

The receive signal path of the bonding circuit x-bond comprises a data fragment buffer (RX-MEM) which is connected to the x-DSL transceivers (PHY). In addition, the receive signal path contains a multiplexer (MUX) for combining the various received data fragments DF, the data fragments DF being reassembled to form a data packet (DP) by a reassembling circuit and temporarily stored in a data packet buffer of the receive signal path provided for this purpose before they are transmitted to the uplink card of the DSLAM circuit by the bonding circuit. The receive signal path, like the transmit signal path, has a controller which controls the multiplexer, the reassembling circuit and the receive data packet buffer.

Apart from the bonding circuit x-bond, the line card has for each port an xDSL transceiver PHY for transmitting and receiving data fragments DF which are exchanged with the terminal connection CPE via the associated telephone line.

A data packet DP coming from the data network, for example an Ethernet data packet, is split into smaller data fragments DF on the transmit signal path of the bonding circuit x-bond and distributed to various signal lines via the demultiplexer. The transceivers PHY then transmit the data fragments DF via a bundle B of telephone lines to the corresponding terminal connection CPE.

Conversely, data fragments DF which are received by a terminal connection CPE are delivered by the x-DSL transceivers PHY to the receive signal path of the bonding circuit x-bond and are there combined by the multiplexer. The combined data fragments DF are then reassembled by the reassembling circuit to form a data packet DP, for example an Ethernet data packet, and temporarily stored in the data packet buffer. The temporarily stored data packets are then transmitted by the bonding circuit of the line card to the uplink card and from there to the data transmission network.

However, the conventional bonding circuit shown in FIG. 3 has the disadvantage that it only allows the bundling of telephone lines which are jointly connected to a line card. In the arrangement according to the prior art shown in FIG. 1, for example, the user of the terminal connection $CPE_B$, whose telephone is connected to the DSLAM circuit via a telephone line, would like to use a second telephone line in order to increase the data transmission rate provided for the terminal connection $CPE_B$. This would allow the user of the terminal connection $CPE_B$, for example, in turn to connect a data transmission modem with a high data transmission rate.

Telephone lines are usually run in parallel in cables which, apart from the telephone lines used, contain additional redundant spare telephone lines. In the arrangement shown in FIG. 1, for example, a further spare line is run. The conventional line card, as shown in FIG. 3, has, for example, M=4 ports, ports 1-3 being connected to the first terminal connection $CPE_A$ of the first user A via the telephone line bundle $B_A$ and the fourth port being connected to the telephone of the second user B. If user B should wish to extend his terminal connection $CPE_B$ to form a bundle in order to increase the data transmission rate, this is not possible since the conventional bonding circuit x-bond according to the prior art does not have a further free port for the connection.

If the conventional DSLAM circuit, as shown in FIG. 2, contains further line cards which have unoccupied ports, it is not possible to connect the spare line to such a port since the fragmentation of the data packets DP to form data fragments DF for the second terminal connection $CPE_B$ and the reassembly of received data fragments DF from the second terminal connection $CPE_B$ takes place within a master bonding circuit and signal delays produced by the data transmission via a different line card and the uplink line card cannot be compensated. The conventional bonding circuit x-bond according to the prior art as shown in FIG. 3 thus only allows telephone lines to be bundled which are connected to the same line card. Bundling subscriber lines which are connected to different line cards or line driver cards is not possible with the bonding circuit according to the prior art shown in FIG. 3. There is thus no possibility for bundling telephone lines for a terminal connection CPE at the DSLAM system level.

BRIEF SUMMARY OF THE INVENTION

In one aspect of the invention, a bonding circuit comprises a transmit signal path for fragmenting data packets to form data fragments which can be distributed to various subscriber lines by means of a first demultiplexer and can be transmitted via subscriber lines of a line bundle to a terminal connection associated with the respective line bundle, a receive signal path which reassembles data fragments which can be received via various subscriber lines of a line bundle from a terminal connection belonging to the respective line bundle and can be combined by means of a first multiplexer, to form data packets, wherein the first demultiplexer of the transmit signal path in each case has at least one output for the transmit direction and one output for the receive direction which is in each case fed back via a data fragment buffer with adjustable delay to a respective input of the first multiplexer of the receive signal path.

The transmit signal path may comprise:

a transmit data packet buffer for temporarily storing data packets which are received by the bonding circuit from an uplink card via a data input, a fragmenting circuit for fragmenting the temporarily stored data packets to form data fragments, and a first demultiplexer, the input of which is connected to the fragmenting circuit and which has a number of outputs for distributing the data fragments to various signal lines which are in each case connected to an associated transmit data fragment buffer with adjustable delay.

Additionally, the transmit signal path may comprise:

a second demultiplexer which is interconnected between the transmit data packet buffer and the fragmenting circuit, a first output of the second demultiplexer being connected to an input of the fragmenting circuit and a second output of the second demultiplexer being connected directly to the input of the first demultiplexer.

Alternatively or additionally, the transmit signal path may comprise:

a transmit data fragment buffer with constant delay which is interconnected between the outputs of the first demultiplexer and the adjustable transmit data fragment buffer with adjustable delay.

Alternatively or additionally, the transmit signal path may comprise:

a transmit controller which controls the transmit data packet buffer, the fragmenting circuit, the two transmit data fragment delay buffers and the two demultiplexers of the transmit signal path, the size of the data fragments being adjustable.

In one embodiment of the inventive bonding circuit, the receive signal path comprises:

a receive data fragment buffer with adjustable delay for temporarily storing receive data fragments which are received by the bonding circuit via various subscriber lines, a first multiplexer for combining the temporarily stored receive data fragments, and a reassembling circuit for reassembling the receive data fragments, combined at an output of the first multiplexer, to form data packets.

The receive signal path may comprise:

a receive data packet buffer for temporarily storing the reassembled data packets which are transmitted to an uplink card via a data output of the bonding circuit.

The receive signal path may comprise:

a second multiplexer which is interconnected between the reassembling circuit and the receive data packet buffer, a first input of the second multiplexer being connected to the output of the reassembling circuit, and a second input of the second multiplexer being connected directly to the output of the first multiplexer.

The receive signal path may comprise:

a receive data fragment buffer which constant delay, which is interconnected between the receive data fragment buffer with adjustable delay and the input of the first multiplexer of the receive signal path.

In one embodiment of the inventive bonding circuit, the receive signal path comprises:

a receive controller which controls the receive data packet buffer, the reassembling circuit, the two receive data fragment buffers and the two multiplexers.

The transmit controller and the receive controller may be connected via a control bus for exchanging status data.

The first demultiplexer of the transmit signal path may comprise a number of outputs, a first group of outputs of the first multiplexer being connected via associated data fragment buffers to transceivers which are in each case connected to a terminal connection via a subscriber line, a second group of outputs of the first demultiplexer being fed back via associated adjustable data fragment buffers to inputs of the first multiplexer of the receive signal path via internal feedback signal lines.

The data transmission rates of the transceivers may be adjustable by the transmit controller.

In a further aspect of the invention, a line card comprises the inventive bonding circuit and a plurality of transceivers, each transceiver being provided between an associated data fragment buffer with adjustable delay and an associated port for a subscriber line.

In another aspect of the invention, a DSLAM circuit comprises a plurality of the inventive line cards, which are connected to an uplink card.

The uplink card may be connected to a backbone data transmission network via at least one broadband line.

In one embodiment of the inventive DSLAM circuit, a first delay of the data fragment buffer provided on a transmit signal path is adjusted by the transmit controller of the bonding circuit on a transmit signal path of a first line card, in such a manner that a first transmission time for transmitting data fragments which are transmitted directly via a subscriber line from a first line card to a terminal connection, corresponds to a second transmission time for transmitting data fragments which are transmitted by the first line card to the terminal connection fed back via the receive signal path of the first line card, the uplink card, a transmit signal path of a second line card and via a subscriber line connected to the second line card.

In a further embodiment of the inventive DSLAM circuit, the receive controller of the first line card controls the second multiplexer provided on the receive signal path of the first line card in such a manner that the reassembling circuit on the receive signal path of the first line card is bypassed.

In another embodiment of the inventive DSLAM circuit, the transmit controller of the second line card controls the second demultiplexer provided on the transmit signal path of the second line card in such a manner that the fragmenting circuit on the transmit signal path of the second line driver is bypassed.

In a further embodiment of the invenetive DSLAM circuit, the delay of a data fragment buffer provided on the receive signal path is adjusted by the receive controller of the bonding circuit of a first line card, in such a manner that a first transmission time for transmitting data fragments which are received directly by the first line card via a subscriber line from a terminal connection corresponds to a second transmission time for transmitting data fragments which are transmitted from the terminal connection via a subscriber line, the receive signal path of a second line card, the uplink card, a transmit signal path of the first line card and fed back onto the receive signal path of the first line card.

In one embodiment of the inventive DSLAM circuit, the transmit controller controls the first line card and the second demultiplexer provided on the transmit signal path of the first line card in such a manner that the fragmenting circuit on the transmit signal path of the first line card is bypassed.

In another embodiment of the inventive DSLAM circuit, the receive controller of the second line card controls the second demultiplexer provided on the receive signal path of the second line driver in such a manner that the reassembling circuit on the receive signal path of the second line card is bypassed.

The data packets may be formed by Ethernet data packets.

The data packets may be formed by ATM cells.

The transceivers may be formed by x-DSL transceivers, particularly by ADSL transceivers, VDSL transceivers or by SHDSL transceivers.

The transceivers may be formed by PON (Passive Optical Network) transceivers.

The invention also provides a method for bonding data fragments, the data fragments being delayed in such a manner that a first transmission time for the direct transmission of data fragments between a master line card and a terminal connection via a first group of subscriber lines of a line bundle corresponds to a second transmission time for transmitting data fragments between the master line card, an uplink card and a further line card via a second group of subscriber lines of the line bundle.

In one embodiment of the inventive method, the data fragments sent to the terminal connection via the line bundle are generated by data packets being split into the data fragments by a fragmenting unit provided in the master line card.

In another embodiment of the inventive method, the data fragments received at the terminal connection via the line bundle are reassembled by a reassembling circuit provided in the master line card to form data packets.

In the further text, preferred embodiments of the bonding circuit according to the invention and of the method according to the invention are described for explaining features essential to the invention.

DETAILED DESCRIPTION OF THE INVENTION

Figure 4:
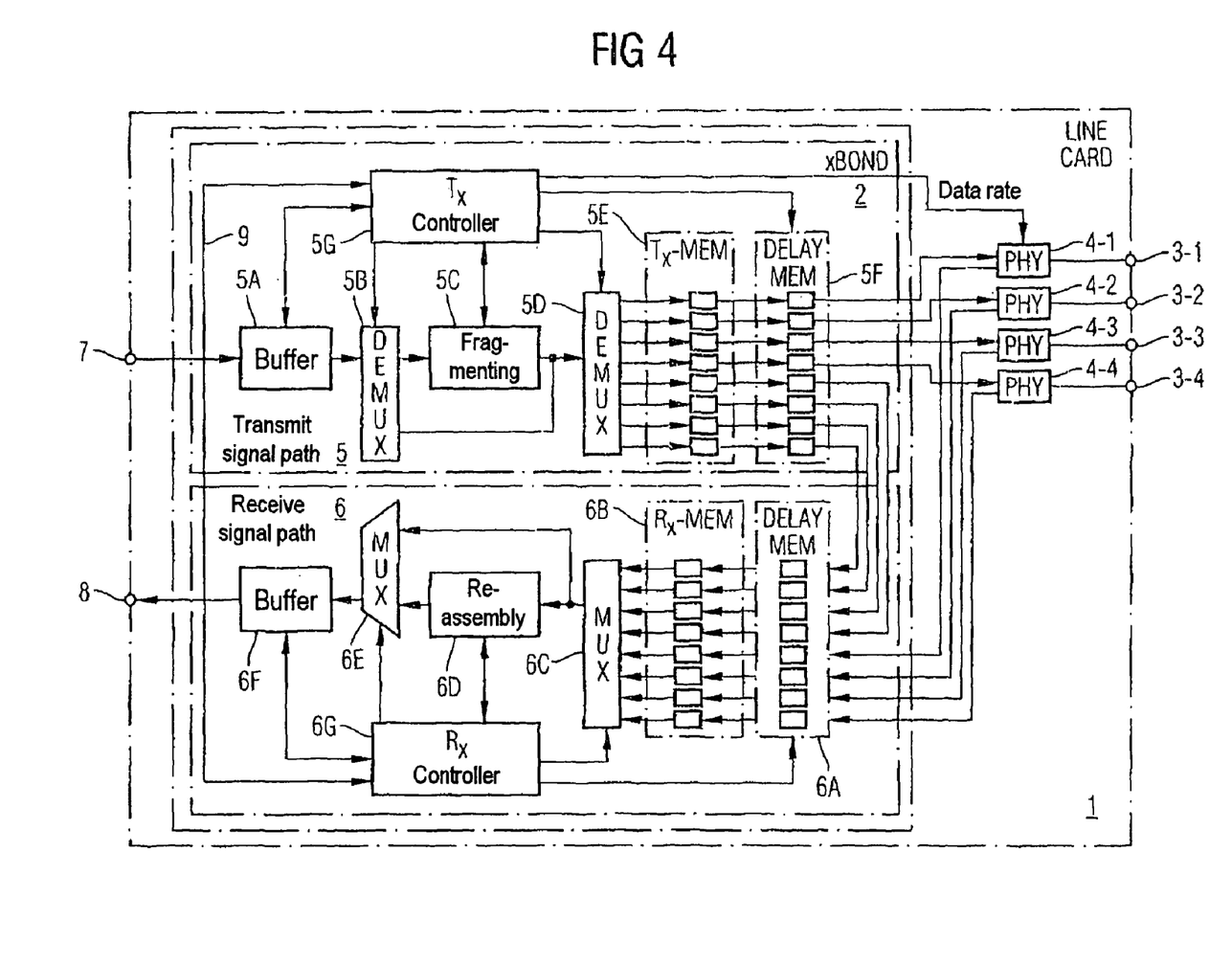
FIG. 4 is a line card with an exemplary embodiment of an inventive bonding circuit.

It can be seen from FIG. 4, a line card 1 which contains a preferred embodiment of the bonding circuit 2 according to the invention has, for example, a number of ports 3-1, 3-2, 3-3, 3-4. In the example shown in FIG. 4, the number of ports is M=4.

At each port 3-*i*, an associated transceiver 4-*i* is connected.

The bonding circuit 2 comprises a transmit signal path 5 and a receive signal path 6. The transmit signal path 5 is provided for fragmenting data packets DP to form data fragments DF which are distributed to the various ports 3-*i* by means of a demultiplexer provided on the transmit signal path. From the ports 3-*i*, the data fragments DF are transmitted to an associated terminal connection CPE via the associated subscriber lines of a line bundle B. The subscriber lines are formed, for example, by telephone lines. In alternative embodiments, the lines are arbitrary signal lines, e.g. optical fibre lines.

The receive signal path 6 of the bonding circuit 2 receives the data fragments DF received via subscriber lines of a line bundle B, combines the received data fragments DF by means of a multiplexer and then reassembles the combined data fragments to form data packets DP.

The transmit signal path 5 preferably contains a transmit data packet buffer 5*a* for temporarily storing data packets DP which are received by the bonding circuit 2 from an uplink card 11 via a data input 7. The output of the transmit data packet buffer 5*a* is connected to an input of a demultiplexer 5*b*, the first output of which is connected to a fragmenting circuit 5*c* and the second output of which is connected directly to an input of a further multiplexer 5*d*. The fragmenting circuit 5*c* is provided for fragmenting the data packets DP temporarily stored in the buffer 5*a*, to form data fragments DF.

The demultiplexer 5*d* is connected at its input to the fragmenting circuit 5*c* and has a number of outputs for distributing the data fragments DF to various signal lines. On the transmit signal path 5, a first transmit data fragment buffer 5*e* is also preferably provided by means of a which a constant signal delay is produced. The transmit data fragment buffer 5*e* is mainly provided for smoothing data volume peaks in the data transmission flow. Apart from the transmit data fragment buffer 5e with constant delay, the transmit signal path 5 of the bonding circuit 2 also contains a transmit data fragment buffer 5f with adjustable delay for compensating for a delay difference between a first transmission time UZ1 for direct transmission of data fragments DF from a line card 1 to a terminal connection CPE and a second transmission time UZ2 for the indirect transmission of data fragments DF via another line card 1 of the DSLAM circuit 10 to the terminal connection CPE. In an alternative embodiment, the transmit data fragment buffer 5e follows the transmit data fragment buffer 5f with adjustable delay, i.e. the data fragments DF are first adjustably delayed and then constantly delayed for smoothing data volume peaks.

The transmit signal path 5 of the bonding circuit 2 also contains a transmit controller 5g which controls and monitors the two demultiplexers 5b, 5d, the data packet buffer 5a and the fragmenting circuit 5c. In addition, the transmit controller 5g controls the transmit data fragment buffer 5f and adjusts the necessary signal delay for compensating for transient time differences. In a preferred embodiment, the transmit controller 5g also controls the data transmission rates of the transceivers 4 provided on the line card 1 and the size of the data fragments formed via a further control line. Driving the demultiplexer 5b enables the fragmenting circuit 5c to be bypassed.

Apart from the transmit signal path 5, the bonding circuit 2 has the receive signal path 6. The receive signal path 6 contains a receive data fragment buffer 6a with adjustable delay for temporarily storing receive data fragments which are received by the bonding circuit 2 from the transceivers 4 via various signal lines. The receive signal path 6 optionally also has a further receive data fragment buffer 6b which produces a constant delay of the received data fragments DF and is provided for smoothing the receive data flow. The order of the two receive data fragment buffers 6a, 6b is interchangeable. The receive data fragment buffers 6a, 6b are connected at their outputs to inputs of a first multiplexer 6c which combines the temporarily stored receive data fragments DF at its output. The output of the multiplexer 6c is connected to a reassembling circuit 6d, on the one hand, and to an input of a further multiplexer 6e, on the other hand. The reassembling circuit 6d reassembles the data fragments combined by the multiplexer 6c to form received data packets, for example received Ethernet data packets. At the output, the reassembling circuit 6d is connected to a further input of the multiplexer 6e. The multiplexer 6e enables the reassembling circuit 6d to be bypassed. The data packets DP delivered by the multiplexer 6e are temporarily stored in a receive data packet buffer 6f of the receive signal path 6 before they are delivered to an uplink card 11 via a data output 8 of the line card 1. The two multiplexers 6c, 6e are controlled by a receive controller 6g provided on the receive signal path 6. In addition, the receive controller 6g controls the receive data packet buffer 6f and the reassembling circuit 6d and monitors the state of these circuits. In addition, the receive controller controls the receive data fragment buffer 6a and adjusts the necessary signal delay time.

The transmit controller 5g and receive controller 6g are connected via a data bus 9 for exchanging status data. The transceivers 4 shown in FIG. 4 are, for example, ADSL transceivers, VDSL transceivers, SHDSL transceivers and PON (Passive Optical Network) transceivers.

Figures 5A, 5A:
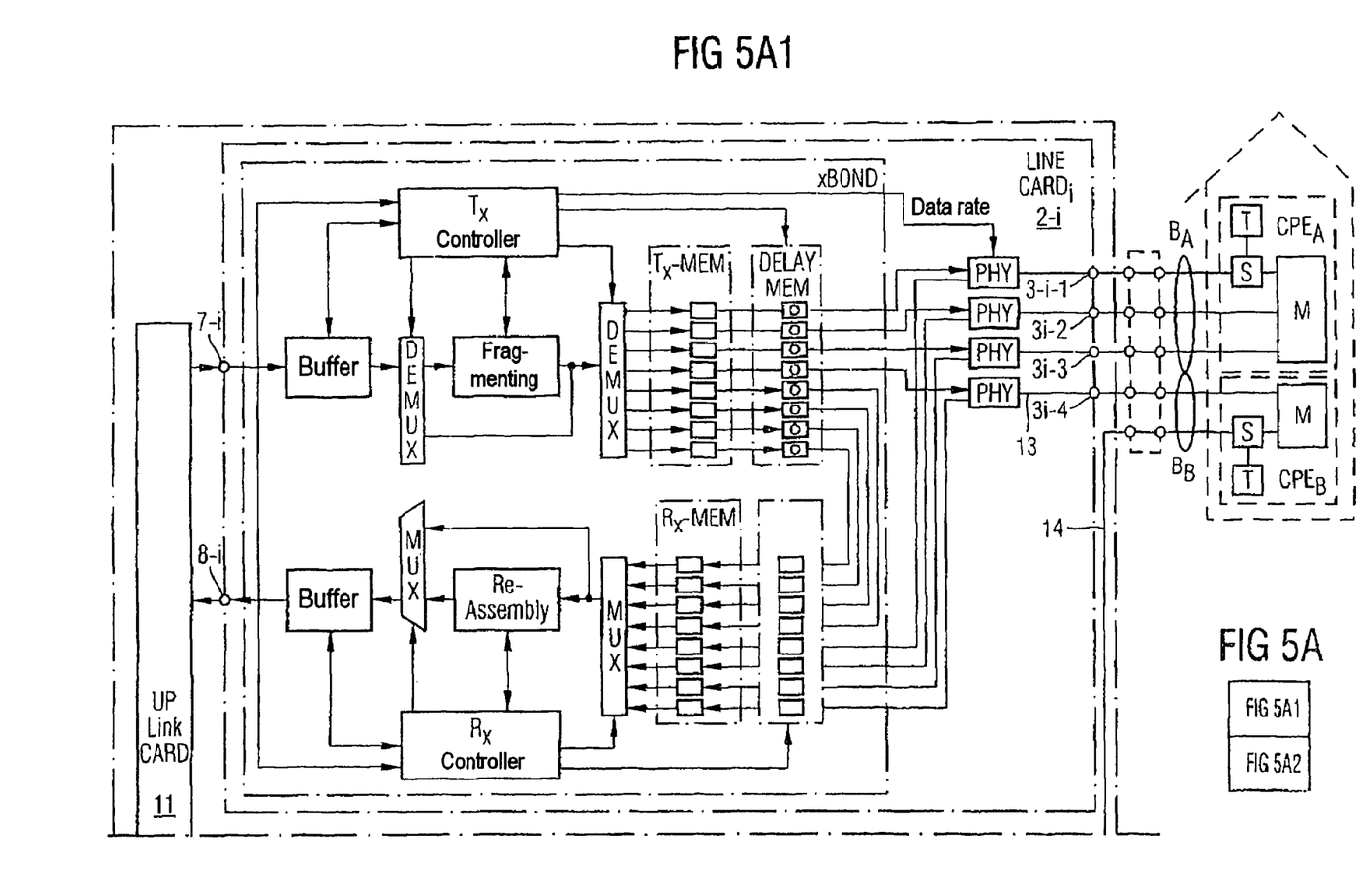
FIG. 5*a* is a first exemplary embodiment of a DSLAM circuit in which a number of line cards are interconnected with the bonding circuit.
Figure 5A:
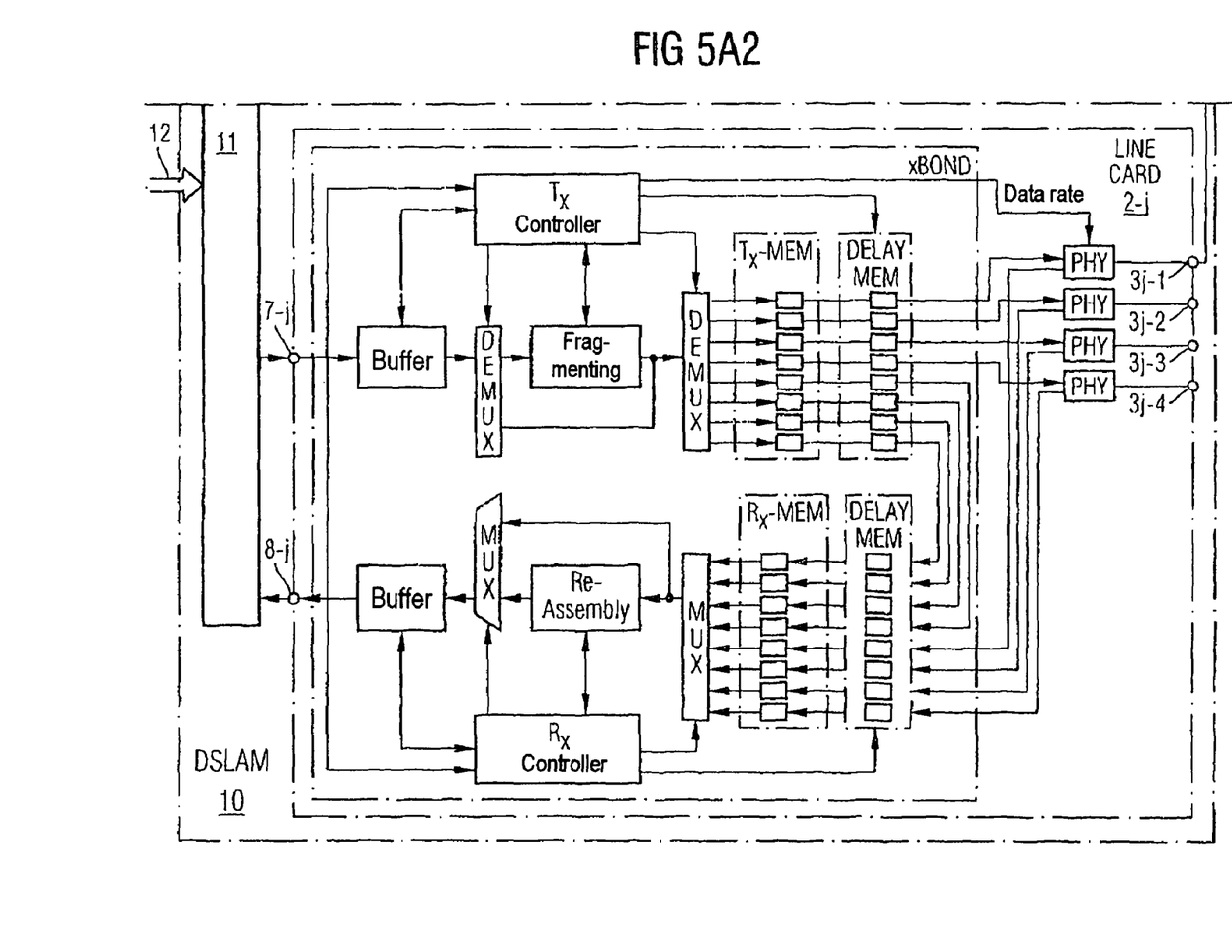
FIG. 5*b* is an exemplary embodiment of a DSLAM circuit in which data fragments are sent to a terminal connection via a line bundle via various line cards.
FIG. 5*c* is an exemplary embodiment of a DSLAM circuit in which data fragments are received from a terminal connection via various lines of a line bundle.
Figure 5B:
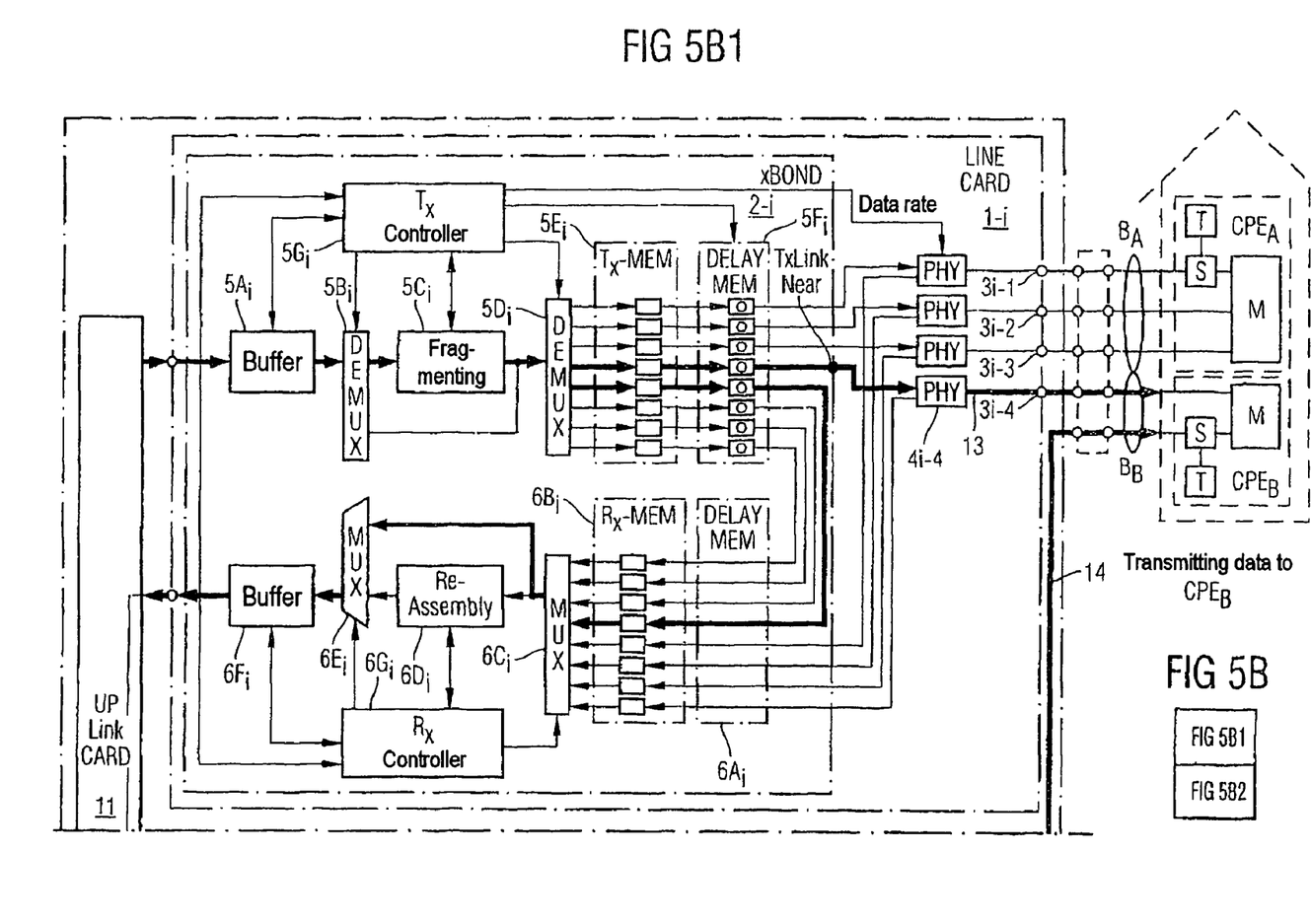
Figure 5B:
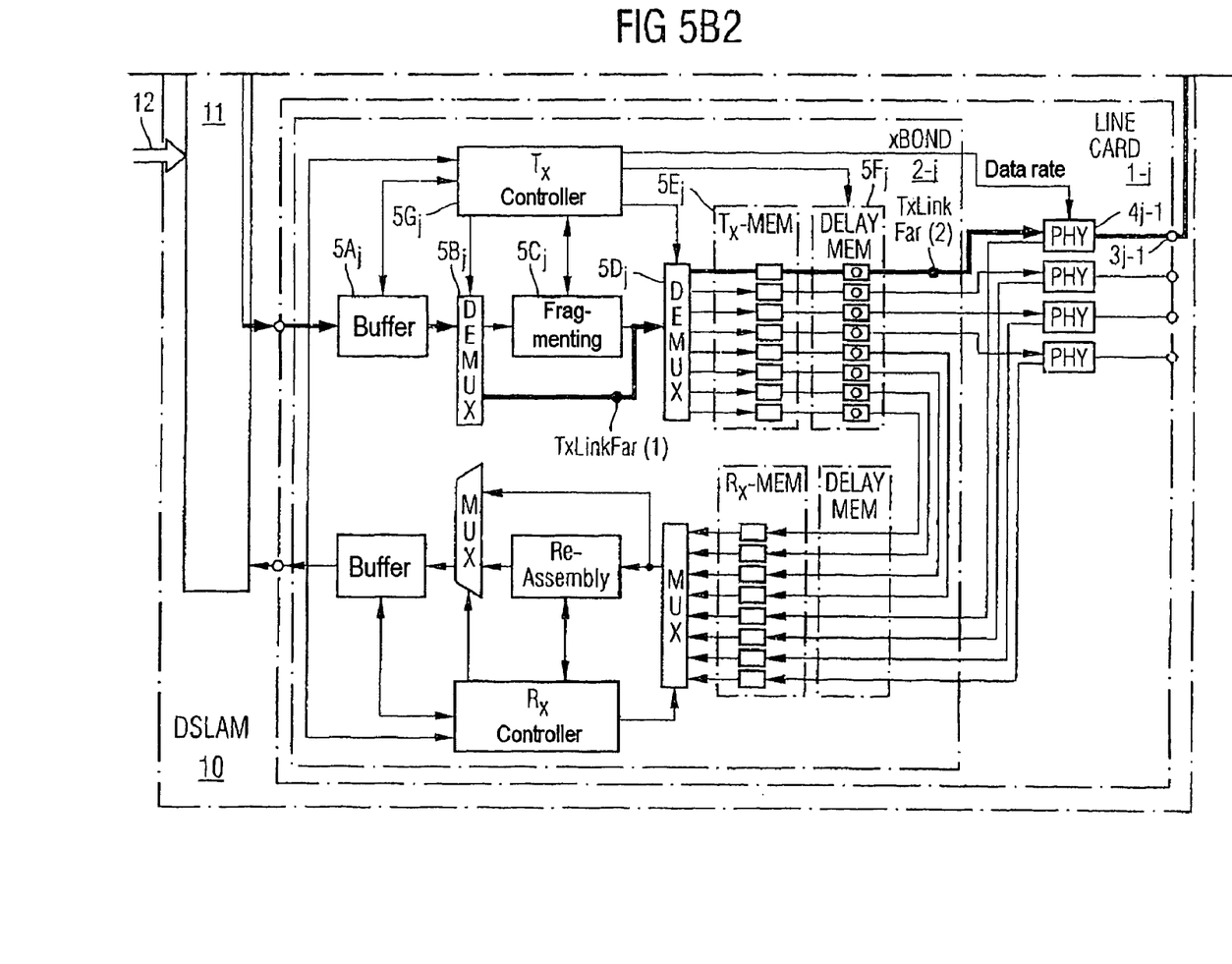

FIG. 5a shows a DSLAM circuit 10 which contains a number of line driver circuits 2i, 2j which are connected to a common uplink card 11. In the example shown in FIG. 5a, the line card 2-i and the line card 2-j in each case have four ports 3. The uplink line card 11 exchanges data packets DP, for example Ethernet data packets, with a broadband network via a broadband line 12. Data packets DP which are provided for terminal connections $CPE_A$, $CPE_B$ are applied to data inputs 7i, 7j of the line cards 2i, 2j by the uplink line card 11. Conversely, the uplink card 11 receives reassembled data packets via data outputs 8i, 8j of the line cards 2i, 2j. The line cards 2-i, 2-j of the DSLAM circuit 10 are configured as shown in FIG. 4.

A special feature of the bonding circuit 2 according to the invention consists in that some of the outputs of the demultiplexer 5d within the transmit signal path 5 are fed back internally via the adjustable transmit data fragment buffer 5f and the adjustable transmit data fragment buffer 5g to inputs of the multiplexer 6c within the receive signal path 6. This feedback within the bonding circuit 1 according to the invention allows subscriber lines to be bundled for a terminal connection CPE via different line cards 2.

In the example shown in FIG. 5a, a telephone line bundle $B_B$ is provided for the terminal connection $CPE_B$, the telephone line bundle $B_B$ consisting of a first telephone line 13 which is connected to the fourth port of the line card 2-i and of a further telephone line 14 which is connected to the first port of the further line card 2-j. For example, the spare line 14 shown in FIG. 1 is used for connecting the terminal connections $CPE_B$ to the line card 2-j.

The DSLAM circuit 10 shown in FIG. 5a can have a multiplicity of line driver circuits 2-i, 2-j, each line card 2-i, 2-j in turn having a multiplicity of ports 3, for example 48 to 96 ports.

FIG. 5b shows the sending of data fragments DF by the DSLAM circuit 10 to the terminal connection $CPE_B$ via the line bundle $B_B$ and via two different line cards 2-i, 2-j, i.e. via the two subscriber lines 13, 14 of the line bundle $B_B$. The data fragments DF delivered by the line card 2-i are transmitted directly to the terminal connection $CPE_B$ via the subscriber line 13. After the fragmentation by the fragmenting circuit $5C_i$, other data fragments DF intended for the terminal connection $CPE_B$ are fed back within the master bonding circuit 2-i from the transmit signal path to the receive signal path of the master bonding circuit 2-i. The data fragments DF fed back are conducted past the bridged reassembling circuit $6D_i$ by the multiplexer 6C on the receive signal path of the bonding circuit 2-i and delivered to the uplink card 11. From the uplink card 11, the data fragments DF are sent via the transmit signal path of the bonding circuit 2-j past the bridged fragmenting circuit $5C_j$ via the data fragment buffers $5E_j$, $5F_j$ from the xDSL transceiver 4j-1 of the first port of the line card 1j via the subscriber line 14 to the terminal connection $CPE_B$. Since the data fragments DF which are transmitted via the feedback, the uplink card 11 and the transmit signal path of the second line card 1j and finally via the subscriber line 14 to the terminal connection $CPE_B$ require a greater transient time than the data fragments DF which are delivered directly to the terminal connection $CPE_B$ from the transmit signal path of the line card 1i via the subscriber line 13, the transmit delay ($T_s$) of the adjustable data fragment buffer $5f_i$ within the transmit signal path 5i of the master bonding circuit 2-i is adjusted for compensating for the transient time difference. In the example shown in FIG. 5b, the data fragment buffer 5f-i delays those data fragments DF which are delivered from the fourth port 3i-4 of the line card 1-i to the terminal connection $CPE_B$ via the subscriber line 13. The data fragments fed back via the uplink card 11 are delivered undelayed to the telephone line 14 via the adjustable signal delay circuit 5f-j provided in the bonding circuit 2j.

Figures 5C, 5C:
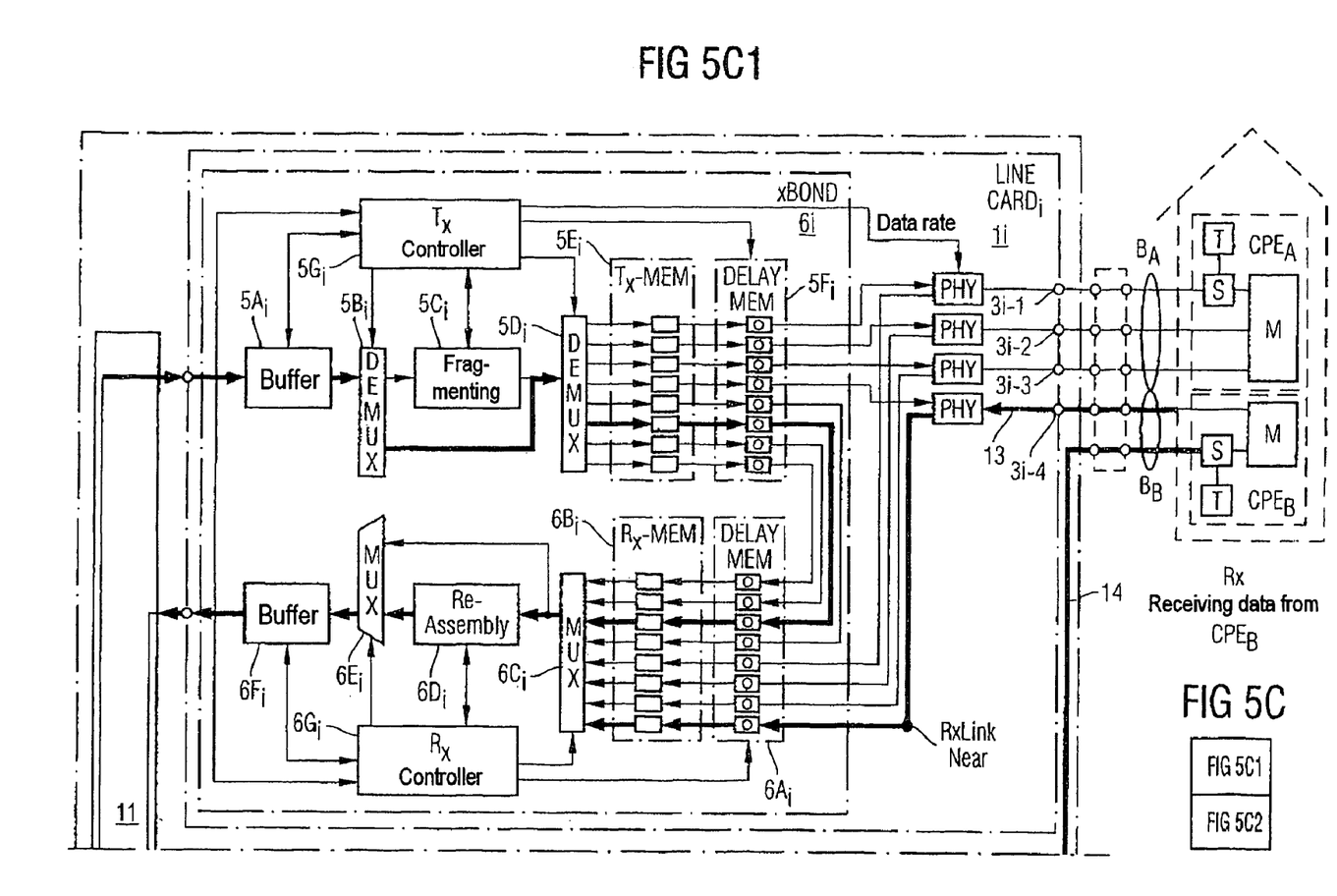
Figure 5C:
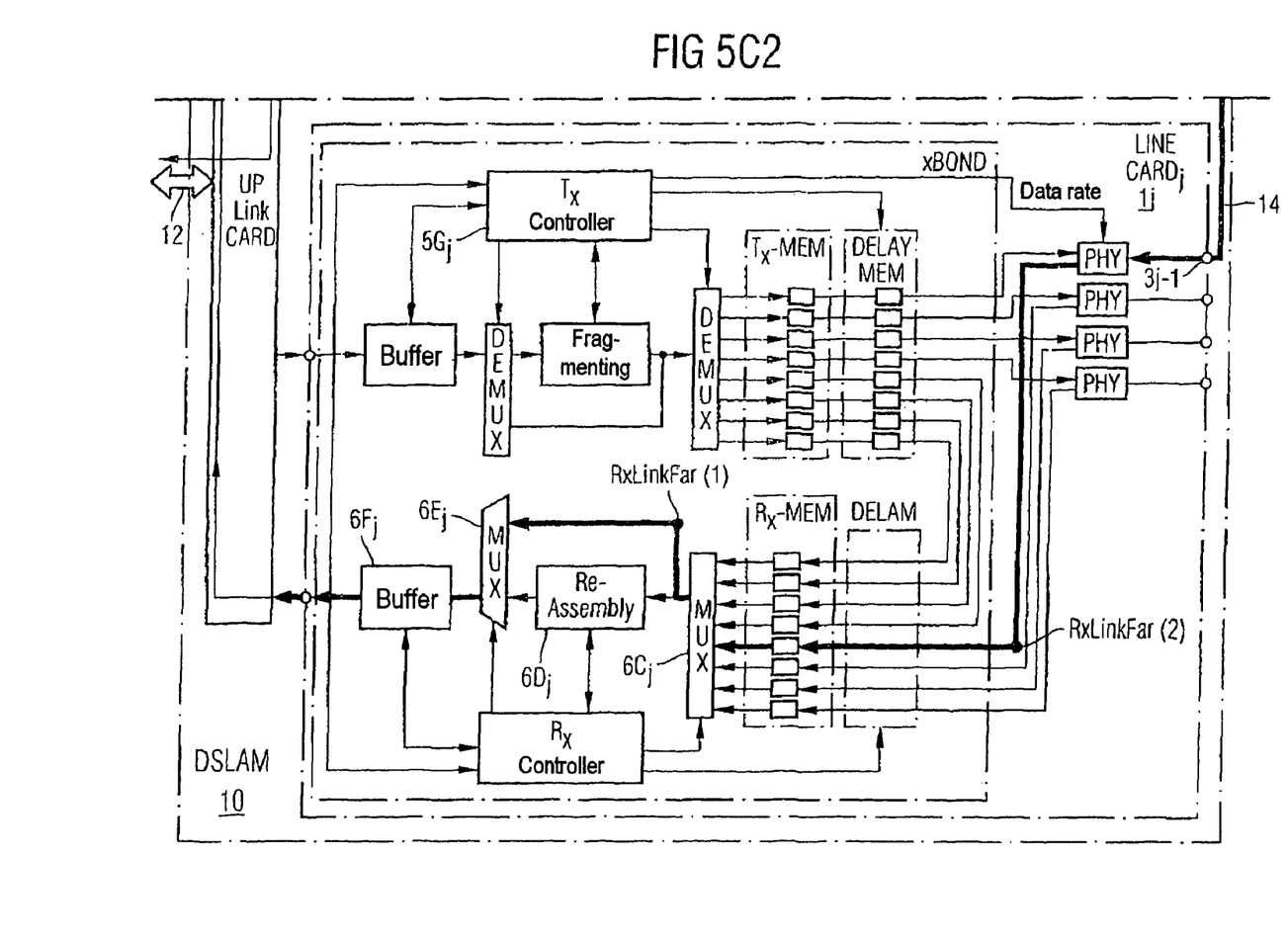

FIG. 5c shows the reception of data fragments DF from the terminal connection $CPE_B$ by the two line cards $1i$, $1j$ of the DSLAM circuit 10 via the telephone line bundle $B_B$ formed by the subscriber lines 13, 14. The data fragments DF received from the subscriber line 13 at port $3_{i-4}$ are delivered to the receive signal path via the associated transceiver. The data fragment buffer $6a_i$ provided there delays the received data fragments and delivers them to an input of its multiplexer $6c_i$.

The data fragments DF received via the subscriber line 14 at the first port $4j_i$ of the other line card $1j$ are coupled onto the transmit signal path of the master line card $1-i$ via the receive signal path $6j$ of the line card $1j$ via the bridged reassembling circuit $6D_j$ and the uplink card 11. The data fragments DF are fed back onto the receive signal path $6i$ of the master line card $1i$ via the bridged fragmenting circuit $5e_i$ and the demultiplexer $5d_i$ and the data fragment buffer $5e_i$ and the data fragment buffer $5f_i$. From there, the data fragments DF pass via the data fragment buffer $6A_i$ and the data fragment buffer $6B_i$ to an input of the multiplexer $6C_i$. The multiplexer $6C_i$ combines the data fragments DF fed back from the subscriber line 14 via the uplink card 11 with the data fragments DF received directly via the subscriber line 13, which are delayed by the data fragment buffer $6A_i$, at its output, the combined data fragments DF then being reassembled by the reassembling circuit $6D_i$ of the master line driver circuit $1i$ to form data packets DP. After being temporarily stored in the data packet buffer $6F_i$ of the master line driver circuit $1i$, the reassembled data packets DP are then delivered to the uplink card 11 for transmission to the data transmission network.

As can be seen from FIGS. 5b, 5c, the data packets DP to be transmitted are fragmented by the fragmenting circuit $5C_i$ of the master line driver circuit $1_i$ and the received data fragments DF are reassembled by the reassembling circuit $6D_i$ of the master line driver circuit $1_i$. Different internal feedback lines are used for the data fragments (DF) to be transmitted and those to be received (DF).

When data fragments DF are sent by the master line driver circuit $1_i$ via a different line driver circuit $1_j$, the reassembling circuit $6D_i$ provided on the receive signal path $6i$ of the master line driver circuit $1i$ is bridged by means of the multiplexer $6E_i$. Furthermore, the fragmenting circuit $5C_j$ provided in the other line driver circuit $1j$ is bridged by means of the multiplexer $5B_j$. The fragmenting of the data packets DP and the reassembling of the received data fragments DF to form data packets DP is always performed by the master line driver circuit $1i$. Other line driver circuits $1j$ are only used for transmitting the data fragments DF to the terminal connection CPE. The signal delay of the data fragments for compensating for transient time differences between various telephone lines of a bundle B is also always effected by an adjustable data fragment buffer $5F_i$, $6A_i$ of the master line driver circuit $1_i$. As shown in FIG. 5b, the transmit delay ($T_s$) of the data fragments DF to be transmitted is effected by the data fragment buffer $5F_i$ on the transmit signal path 5 of the bonding circuit $2_i$. The received delay ($T_E$) of the received data fragments DF is effected, as shown in FIG. 5c, by the data fragment buffer $6A_i$ on the receive signal path of the bonding circuit $2_i$. The data fragments DF transmitted directly are in each case delayed in such a manner that their transmission time corresponds to the transmission time of the data fragments DF transmitted indirectly via the uplink card 11.

In the method according to the invention, for the purpose of bonding data fragments, the data fragments DF are delayed in such a manner that a first transmission time ÜZ1 for the direct transmission of data fragments DF between a master line card $1_i$ and a terminal connection $CPE_B$ via a first group of subscriber lines, for example via the telephone line 13, of a line bundle $B_B$ exactly corresponds to a second transmission time ÜZ2 for transmitting data fragments DF between the master line card $1_i$ via the uplink card 11 and finally another line card $1j$ via a second group, i.e. the telephone line 14, of the line bundle $B_B$. The DSLAM circuit 10 as shown in FIGS. 5a, 5b, 5c has the advantage that it can be arbitrarily scaled, i.e. it is arbitrarily extendable and provides for flexible bundling of subscriber lines via different line cards $1_i$, $1_j$ of the DSLAM circuit 10. The DSLAM circuit 10 according to the invention thus allows bonding at system level via two or more line cards 1.

Figure 6A:
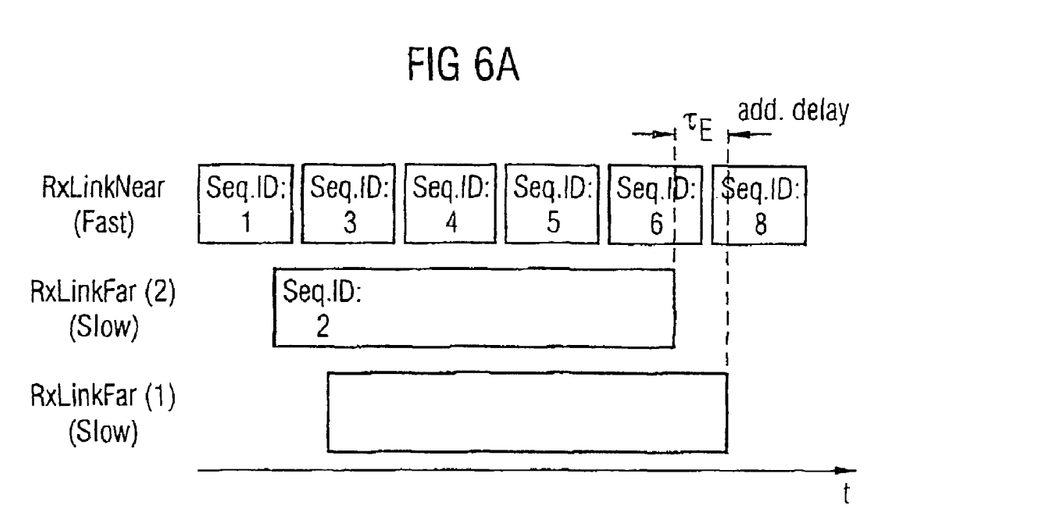
FIG. 6*a*, 6*b* are signal diagrams for explaining the operation of the inventive bonding circuit.
Figure 6B:
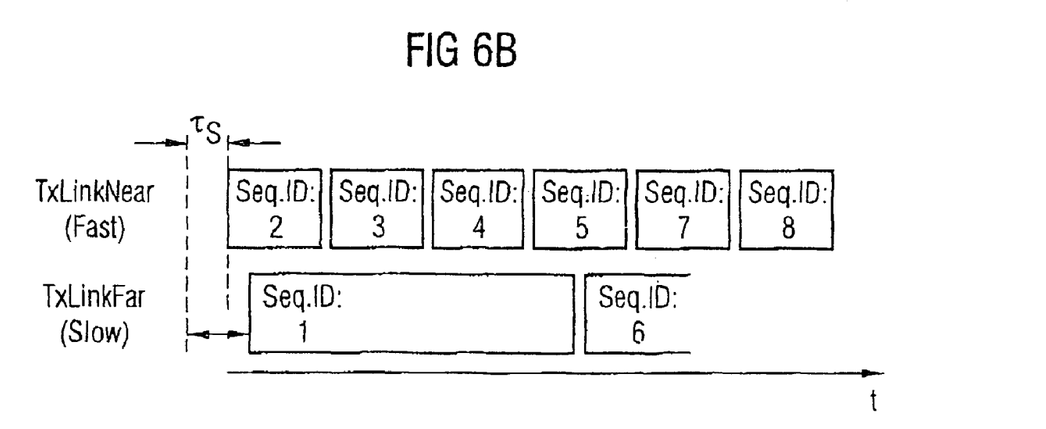

FIGS. 6a, 6b are used for explaining the operation of the bonding circuit 2 according to the invention. In the example shown in FIG. 6a, a data packet DP, for example an EFM (Ethernet First Mile) data packet is split into various data fragments DF, each data fragment having a sequence ID number (SEQ ID) in order to establish the sequence of the split data fragments DF for the later reassembly.

FIG. 6a shows the reception of data fragments at a ratio of four, i.e. the data fragments DF received via the internal feedback are allowed to have a maximum transmission time which is four times as large as the transmission time of the data fragments transmitted directly via the telephone line 13. As can be seen from FIG. 6a, the data fragment 2, for example, which is received via the indirect signal path, has an adjustable received signal delay $T_E$.

As can be seen from FIG. 6b, a data fragment 1 transmitted via the indirect feedback, for example, has an adjustable transmit signal delay time $T_S$ with respect to a data fragment 2 transmitted directly.

The data fragment buffers $6b$ on the receive signal path of the bonding circuit 2 are used, for example, for compensating for an additional signal delay of 100 μsec in the EFM/PAF bonding standard for smoothing and will be dimensioned as follows.

The EFM/PAF standard is aimed at a VDSL and SHDSL technology and is based on an upstream data transmission rate of 100 MB/sec and 5.7 MB/sec, respectively. With an upstream data transmission rate of 100 MB/sec, the dimensioning is based on a real data transmission rate of 50 MB/sec, resulting in the additional data buffer size as follows:

$$RX \text{ MEMORY} = 50 \text{ MB/sec} \times 100 \text{ μsec} = 5 \text{ kB}.$$

For the IMA-plus standard, which is aimed at ADSL 2 and SHDSL technology and is based on upstream data transmission rates of 3 MB and 5.7 MB/sec, respectively, the additional data buffer sizes for the data fragment buffer $6b$ are obtained as follows:

$$RX \text{ MEMORY} = 5.7 \text{ MB/sec} \times 25 \text{ μsec} = 0.1 \text{ kbit},$$

using an additional signal delay time of 25 μsec as a basis.

In an alternative embodiment of the bonding circuit 2 according to the invention as shown in FIG. 4, the different transient times between the data fragments DF transmitted directly and indirectly are not compensated for by providing an additional data fragment buffer with variable signal delay time but by adjusting the data transmission rates of the transceivers $4-i$ and the size of the data fragments DF formed.

For the EFM/PAF standard which is aimed at VDSL and SHDSL technology and is based on downstream data transmission rates of 100 MB/sec and 5.7 MB/sec, respectively, the resultant ratio of quotient to be set of fragment size and data transmission rates of the transceivers for the direct and indirect transmission of the data fragments, taking into consideration a real data transmission rate of 50 MB/sec, is obtained as follows:

Ratio=(fragment size_slow/data transmission rate_slow)/(fragment size_fast/data transmission rate_fast)=((MEM MAX DIFF Delay $CPE$(Max. Drate×Max ADD Delay))/Max frag Ratio=15 000 bit−(50 MB/sec×100 μsec))/512 bytes Ratio=2.4 taking into consideration that the EFM/PAF standard allows a maximum additional time delay of 15 000 bit delay times to be compensated for and allows a maximum data fragment size of 512 bytes.

The data transmission ratio for the IMA-plus standard, which is aimed at ADSL 2-plus and SHDSL technology, can be calculated similarly on the basis of a downstream data transmission rate of 28 MB/sec and 5.7 MB/sec, respectively. In addition, the IMA-plus standard specifies a maximum delay of 4 msec and a maximum transmission ratio of 4:1 with a maximum cell length of 53 bytes.

At a maximum delay, the data fragment delay buffer thus has a size of

MEM MAX DIFF DELAY $CPE$=4×53 bytes

The data transmission ratio is thus obtained as follows:

Ratio=(MEX MAX DIFF DELAY $CPE$−(Max Drate× Max ADD Delay))/Max frag

Ratio=(1.696 bit−(28 MB/sec×25 μsec))/53 bytes

Ratio=2.3 assuming an additional maximum delay time of 25 μsec due to the indirect data fragment transmission.

The bonding circuit 2 according to the invention as shown in FIG. 4 is suitable for any standard in which data packets DP are split into data fragments DF and conversely data fragments DF are reassembled to form data packets DP.

The bonding circuit 2 according to the invention is preferably integrated on a line driver circuit 1 within a DSLAM circuit 10. In alternative embodiments, the bonding circuit 2 according to the invention is not provided at the exchange or in exchange installation but at the user or at the terminal connection device (CPE).

What is claimed is:

1. A bonding circuit for a line card, comprising:
a transmit signal path for generating data fragments by fragmenting data packets;
wherein the data fragments are distributed to various subscriber lines by means of a first demultiplexer and
wherein the data fragments are transmitted via subscriber lines of a line bundle to a terminal connection associated with the respective line bundle;
a receive signal path for generating data packets by reassembling data fragments, which are received via various subscriber lines of a line bundle from a terminal connection belonging to the respective telephone line bundle and are combined by means of a first multiplexer;
said first demultiplexer comprising a first group of demultiplexer outputs which are connected via at least one data fragment buffer to a terminal connection and a second group of demultiplexer outputs being fed back via at least one data fragment buffer with adjustable delay to inputs of the first multiplexer; and
a second demultiplexer connected between a transmit data packet buffer and a fragmenting circuit, said second demultiplexer comprising a first output connected to an input of the fragmenting circuit and a second output connected directly to an input of the first demultiplexer.

2. The circuit of claim 1, wherein:
the transmit data packet buffer is configured for temporarily storing data packets received by the bonding circuit from an uplink card via a data input;
the fragmenting circuit is configured for generating data fragments by fragmenting the data packets temporarily stored in the transmit data packet buffer; and
the input of the first demultiplexer is connected to the fragmenting circuit.

3. The circuit of claim 2, wherein the transmit signal path further comprises a transmit data fragment buffer with constant delay connected between the outputs of the first demultiplexer and the adjustable transmit data fragment buffer with adjustable delay.

4. The circuit of claim 1, wherein the transmit signal path further comprises a transmit data fragment buffer with constant delay connected between the outputs of the first demultiplexer and the adjustable transmit data fragment buffer with adjustable delay; and a transmit controller controlling the transmit data packet buffer, the fragmenting circuit, the transmit data fragment delay buffers, and the first and second demultiplexers of the transmit signal path.

5. The circuit of claim 1, wherein the receive signal path comprises a receive data fragment buffer with adjustable delay for temporarily storing receive data fragments received by the bonding circuit via various subscriber lines;
the first multiplexer for combining receive data fragments temporarily stored in the receive data fragment buffer; and
a reassembling circuit to generate data packets by reassembling the receive data fragments combined at an output of the first multiplexer.

6. The circuit of claim 5, wherein the receive signal path further comprises a receive data packet buffer for temporarily storing the reassembled data packets which are transmitted to an uplink card via a data output of the bonding circuit.

7. The circuit of claim 6, wherein the receive signal path further comprises a second multiplexer connected between the reassembling circuit and the receive data packet buffer, said second multiplexer comprising a first input connected to the output of the reassembling circuit, and comprising a second input connected directly to the output of the first multiplexer.

8. The circuit of claim 7, wherein the receive signal path further comprises a receive data fragment buffer with constant delay connected between the receive data fragment buffer with adjustable delay and the input of the first multiplexer.

9. The circuit of claim 8, wherein the received signal path further comprises a receive controller controlling the receive data packet buffers, the reassembling circuit, the receive data fragment buffers, and the first and second multiplexers.

10. The circuit of claims 4 or 9, wherein the transmit controller and the receive controller exchange status data via a control bus.

11. The circuit of claim 1, wherein the first group of demultiplexer outputs of said first demultiplexer is connected via associated data fragment buffers to transceivers each connected to a terminal connection via a subscriber line, and wherein the second group of demultiplexer outputs is fed back via associated data fragment buffers to inputs of the first multiplexer of the receive signal path via internal feedback signal lines.

12. The circuit of claim 11, wherein data transmission rates of said transceivers are adjusted by the transmit controller of the transmit signal path.

13. The circuit of claim 11, wherein the transceivers are formed by digital transceiver line (xDSL) transceivers.

14. The circuit of claim 1, wherein the subscriber lines are at least one of telephone or optical fibre lines.

15. The circuit of claim 1, wherein the data packets are formed by Ethernet data packets or Asynchronous Transfer Mode (ATM) cells.

16. A line card comprising: the bonding circuit of claim 1; and a plurality of transceivers, each being provided between an associated data fragment buffer with adjustable delay and an associated port for a telephone line.

17. A digital subscriber line access multiplexer (DSLAM) circuit comprising a plurality of line cards according to claim 16 connected to an uplink card.

18. The DSLAM circuit of claim 17, wherein the uplink card is connected to a backbone network via a broadband line.

19. The DSLAM circuit of claim 17, wherein a delay of the adjustable data fragment buffer provided on a transmit signal path is adjusted by a transmit controller of the bonding circuit on the transmit signal path of a first line card such that a first transmission time for transmitting data fragments, which are transmitted directly from the first line card to a terminal connection via a first subscriber line of a line bundle, corresponds to a second transmission time for transmitting data fragments which are transmitted from the first line card fed back via the receive signal path of the first line card, the uplink card, a transmit signal path of a second line card, and via a further telephone line, connected to the second line card, of the telephone line bundle to the terminal connection.

20. The DSLAM circuit of claim 19, wherein a receive controller of the first line card controls a second multiplexer provided on the receive signal path of the first line card, during the sending of data to the terminal connection, such that a reassembling circuit on the receive signal path of the first line card for the feedback signal path is bridged.

21. The DSLAM circuit of claim 19, wherein the transmit controller of the second line card controls a second demultiplexer provided on the transmit signal path of the second line card, such that a fragmenting circuit on the transmit signal path of the second line card is bridged during the transmitting of data to the terminal connection.

22. The DSLAM circuit of claim 17, wherein the delay of a data fragment buffer provided on the receive signal path is adjusted by a receive controller of the bonding circuit provided in a first line card is adjusted such that a first transmission time for transmitting data fragments which are received directly via the first line card from a terminal connection via a first subscriber line of a telephone line bundle corresponds to a second transmission time for transmitting data fragments which are transmitted from the terminal connection via a further subscriber line of the line bundle, the receive signal path of a second line card, the uplink card, a transmit signal path of the first line card and fed back onto the receive signal path of the first line card.

23. The DSLAM circuit of claim 22, wherein the transmit controller of the first line card drives the second demultiplexer, provided on the transmit signal path of the first line card, during the reception of data from the terminal connection, in such a manner that the fragmenting circuit on the transmit signal path of the first line card for the feedback path is bridged.

24. The DSLAM circuit of claim 22, wherein the receive controller of the second line card controls the second multiplexer provided on the receive signal path of the second line card, in such a manner that the reassembling circuit on the receive signal path of the second line card is bridged during the reception of data from the terminal connection.

25. The line card of claim 16, wherein the transceivers are at least one of asymmetric digital subscriber line (ADSL), very high bitrate DSL (VDSL) or passive optical network (PON) transceivers.

26. A method for bonding data fragments, comprising:
delaying data fragments in such a manner that a first transmission time for a direct transmission of data fragments between a first line card and a terminal connection via a first group of subscriber lines of a line bundle corresponds to a second transmission time for an indirect transmission of data fragments between the first line card, an uplink card and a second line card via a second group of subscriber lines of the line bundle, and
generating the data fragments transmitted to the terminal connection via said line bundle by splitting data packets into the data fragments utilizing a fragmenting unit provided in the first line card,
wherein the fragmenting unit generates data fragments by fragmenting the data packets temporarily stored in the transmit data packet buffer; and
a transmit data fragment buffer with constant delay is connected between the outputs of the first demultiplexer and the adjustable transmit data fragment buffer with adjustable delay.

27. The method of claim 26, further comprising generating data packets by reassembling the data fragments received from the terminal connection via line bundle utilizing a reassembling circuit provided in the first line card.

28. A circuit for a first line card, said circuit comprising:
means for delaying data fragments in such a manner that a first transmission time for a direct transmission of data fragments between said first line card and a terminal connection via a first group of subscriber lines of a line bundle corresponds to a second transmission time for an indirect transmission of data fragments between said first line card, an uplink card and a second line card via a second group of subscriber lines of said bundle, and
means for generating the data fragments transmitted to the terminal connection via said line bundle by splitting data packets into the data fragments utilizing a fragmenting unit provided in the first line card,
wherein the fragmenting unit is generating data fragments by fragmenting the data packets temporarily stored in the transmit data packet buffer; and
a transmit data fragment buffer with constant delay is connected between the outputs of the first demultiplexer and the adjustable transmit data fragment buffer with adjustable delay.

* * * * *